United States Patent [19]
Chen

[11] Patent Number: 5,664,292
[45] Date of Patent: Sep. 9, 1997

[54] SEPARABLE CLIP ASSEMBLY

[75] Inventor: Tonny Chen, Changhua, Taiwan

[73] Assignee: E Lead Electronic Co., Ltd., Changhua, Taiwan

[21] Appl. No.: 697,349

[22] Filed: Aug. 22, 1996

[51] Int. Cl.[6] .................................................. A45F 5/02
[52] U.S. Cl. ........................ 24/3.11; 24/3.12; 248/231.51
[58] Field of Search ............................ 24/3.5, 3.11, 3.12, 24/597; 224/252, 269, 666, 668, 271, 272; 248/231.51, 231.61, 316.5, 316.6, 316.7

[56]         References Cited
            U.S. PATENT DOCUMENTS

| | | | |
|---|---|---|---|
| 4,536,925 | 8/1985 | Boothe et al. | 24/3.11 X |
| 4,780,934 | 11/1988 | Vickers et al. | 24/3.11 |
| 5,081,709 | 1/1992 | Benyo et al. | 224/252 X |
| 5,129,126 | 7/1992 | Huang | 24/3.11 |
| 5,261,122 | 11/1993 | Otsuki et al. | 224/252 X |
| 5,331,721 | 7/1994 | Raum, Sr. | 24/3.12 |
| 5,385,282 | 1/1995 | Chen | 24/3.11 X |
| 5,488,759 | 2/1996 | Lim et al. | 24/3.12 |
| 5,507,464 | 4/1996 | Hamerski et al. | 248/683 |
| 5,528,770 | 6/1996 | Castilla et al. | 224/269 X |

*Primary Examiner*—Peter M. Cuomo
*Assistant Examiner*—Robert J. Sandy
*Attorney, Agent, or Firm*—Bacon & Thomas

[57]         ABSTRACT

A detachable clip assembly has a clip member which is removably engaged with a securing seat fixed to the back of a pager, a remote controller, a cell phone and a leather pocket etc. The securing seat has a positioning hole at the upper portion thereof. The clip member has a spring biased push plate on which a press button having a projected rib is disposed. The push plate is inserted into the securing seat with the projected rib engaged with the positioning hole for locking purpose. The press button can be actuated to get the projected rib to engaged with or disengaged from the positioning hole so that the clip member can be either removed from the securing seat or secured to the same as one desires.

5 Claims, 9 Drawing Sheets

SEPARABLE CLIP ASSEMBLY

BACKGROUND OF THE INVENTION

The present invention relates to a separable or detachable clip assembly, particularly to a clip assembly mounted to the back of a paging device, a remote controller, a cell phone or a leather pack. The clip assembly has a securing seat which is fixed to the back of such devices and a separable clip member having a retaining plate. The securing seat is provided with a receiving groove with which the retaining plate of the clip member can be slidably engaged.

Referring to FIG. 1, pager 1 is provided with a fixed clip 11 which can be attached to the belt of a person call. Such clip 11 is easily broken and hard to repair when damaged. Besides, when the pager device is put in a pocket, the clip 11 takes up relatively large space and makes the pocket bulged. Moreover, a conventional cell phone is provided with a clip which is secured to the back of a battery pack of a cell phone by a double-faced glue piece. Such a clip protrudes and is also fixed in place so that it must be equipped with a special charger for charging purpose and can not be matched with common chargers sold on markets.

SUMMARY OF THE INVENTION

Therefore, the primary object of the present invention is to provide a separable clip assembly which can be removably mounted to a securing seat fixed to device such as a remote controller, a cell phone and a leather pocket.

DETAILED DESCRIPTION OF THE PREFERRED EMBODIMENTS

Figure 1:
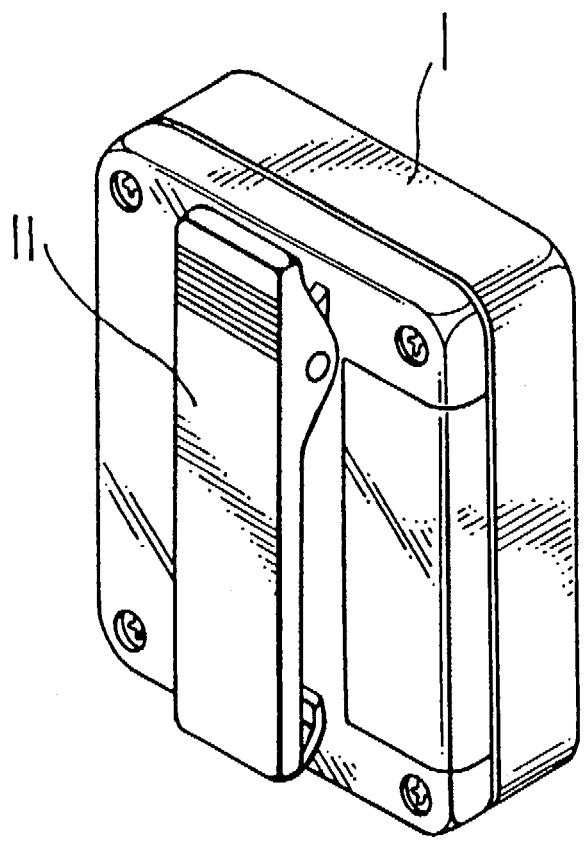
FIG. 1 is a perspective diagram showing a conventional clip in attachment to the back of device.
Figure 2:
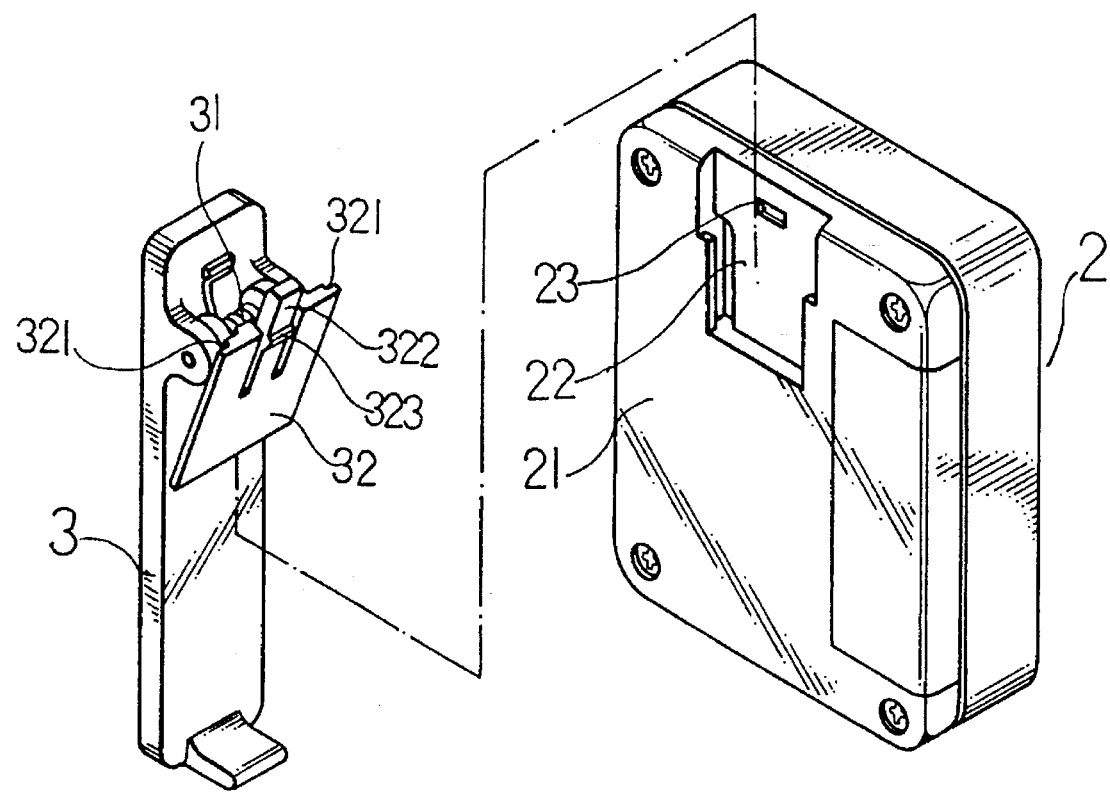
FIG. 2 is a diagram showing the separated clip member and the securing seat of the present invention.

Referring to FIG. 2, the first embodiment of the present invention is comprised of a grooved clip seat 22 disposed on the back 21 of a paging device 2 for the retaining engagement of a clip member 3. A positioning hole 23 is disposed at the upper portion of the clip seat 22.

The clip member 3 is provided with a bias spring 31 and a push plate 32 having a retaining recess 321 on each side thereof for locking engagement with the clip seat 22 of the paging device 2. A press button 322 having a projected rib 323 which is engaged with the positioning hole 23 of the clip seat 22 is defined on the push plate 32.

Figure 3:
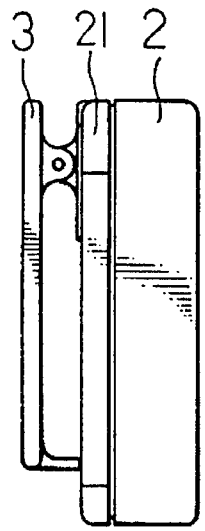
FIG. 3 is a side view of the clip assembly of the present invention in connection to the back of device.
Figure 4:
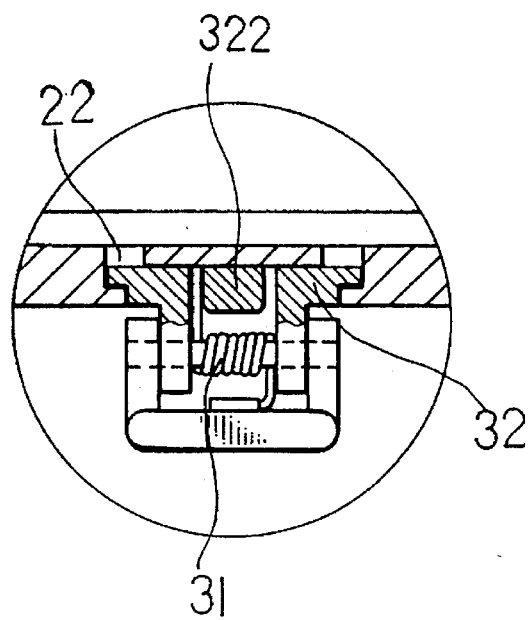
FIG. 4 is a sectional view showing the detailed structure of the clip member thereof.

Referring further to FIGS. 2, 3, 4, the assembly of the present invention is clearly illustrated in the diagrams. As the clip member 3 is to be secured to the paging device 2, the retaining recesses 321 of the push plate 32 of the clip member 3 are pushed along the inner wall of the clip seat 22 with the press button 322 forced down, making the clip member 3 engaged with the clip seat 22. The press button 322 is then released when the retaining recesses 321 of the clip member 3 is fully engaged with the clip seat 22, permitting the projected rib 323 to engage with the positioning hole 23 for locking the clip member 3 in place, as shown in FIG. 4.

To detach the clip member 3 from the clip seat 22 on the back 21, the press button 322 is pushed upwardly and held in position so as to make the projected rib 323 separate from the positioning hole 23. Then, the push plate 32 of the clip member 3 is pushed out of the clip seat 22 to complete the detachment of the clip member 3 from the clip seat 22.

Figure 5:
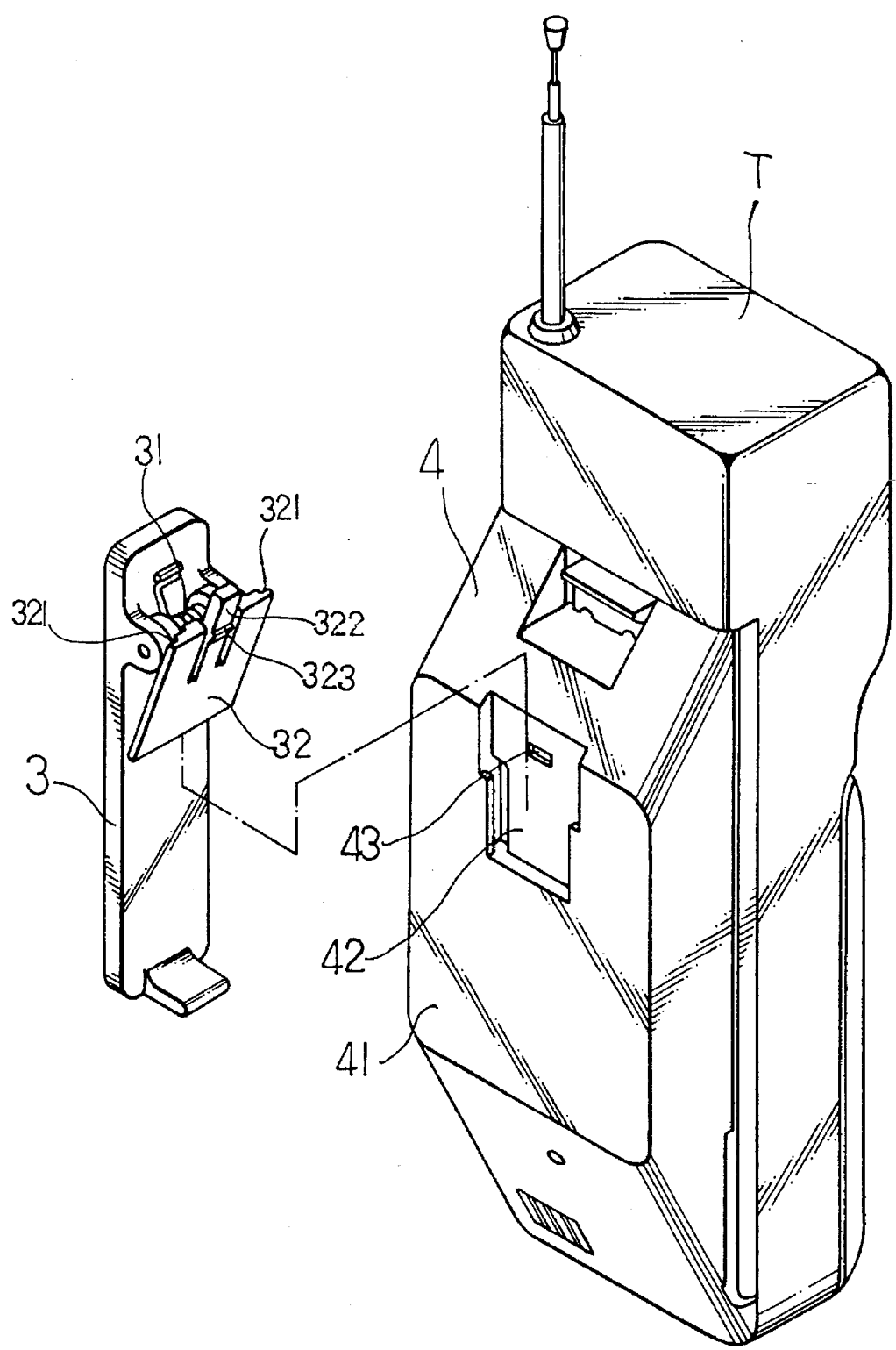
FIG. 5 is a perspective diagram showing the separated clip member and a securing seat attached to the back of a cell phone of the present invention in the first embodiment.
Figure 6:
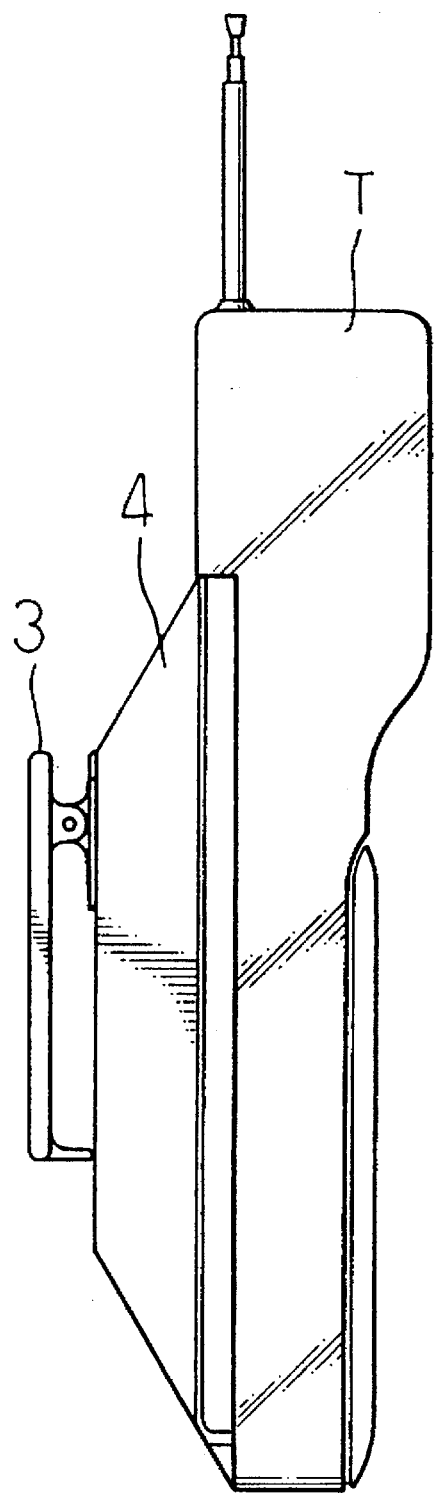
FIG. 6 is a side view of the clip assembly attached to the back of a cell phone.

Referring further to FIGS. 5, 6, another embodiment of the present invention is illustrated. A retaining seat 42 is disposed on the back side of a battery unit 4 of a cell phone T for the securing insertion of the push plate 32 of the clip member 3. At the upper portion of the retaining seat 42 is disposed a positioning hole 43 with which the projected rib 323 of the press button 322 is engaged for securing the clip member in place. The operation mode of this embodiment is the same as the proceeding one and is not futher presented in detail.

Figure 7:
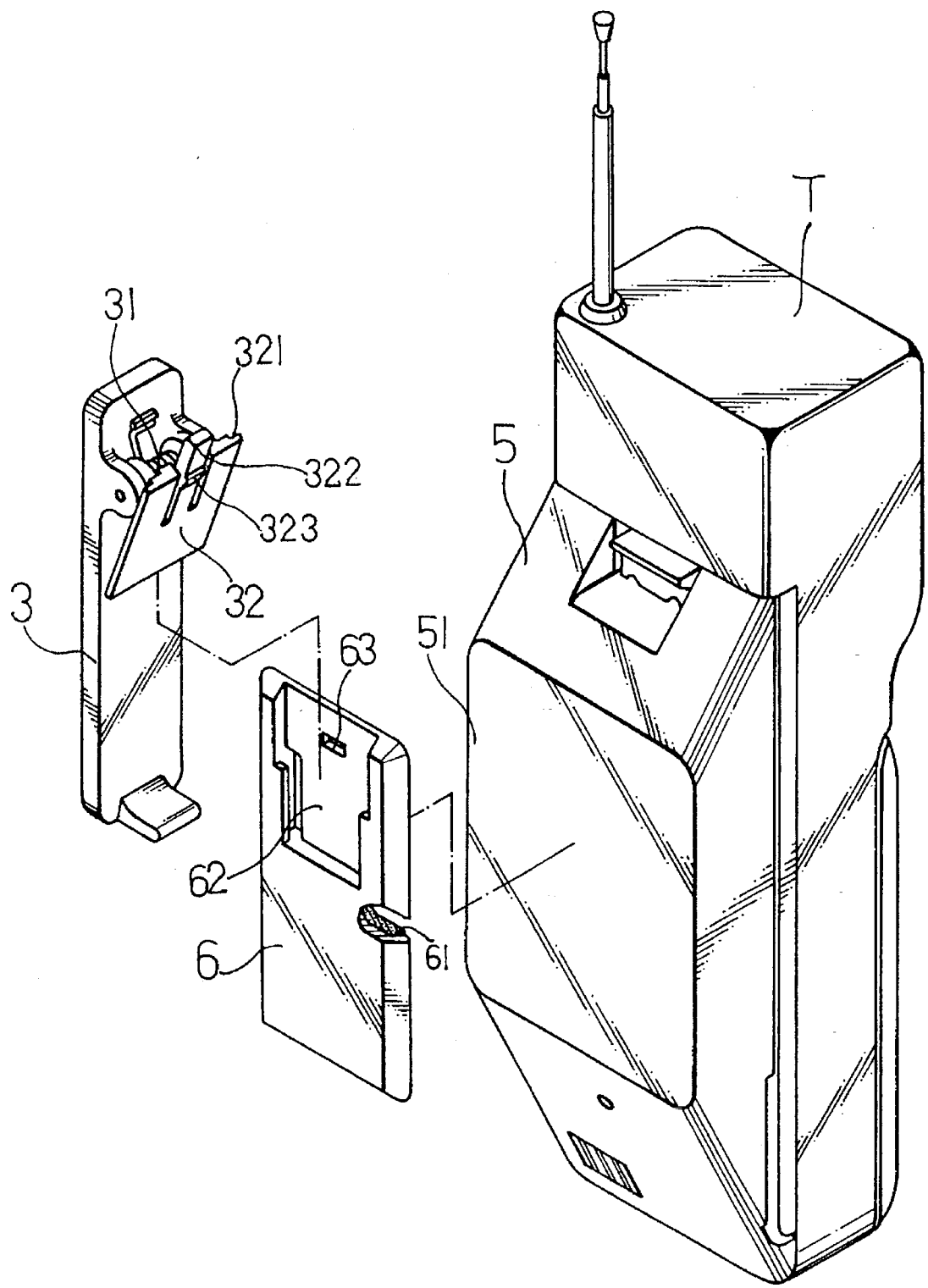
FIG. 7 is a diagram showing a second embodiment of the present invention.
Figure 8:
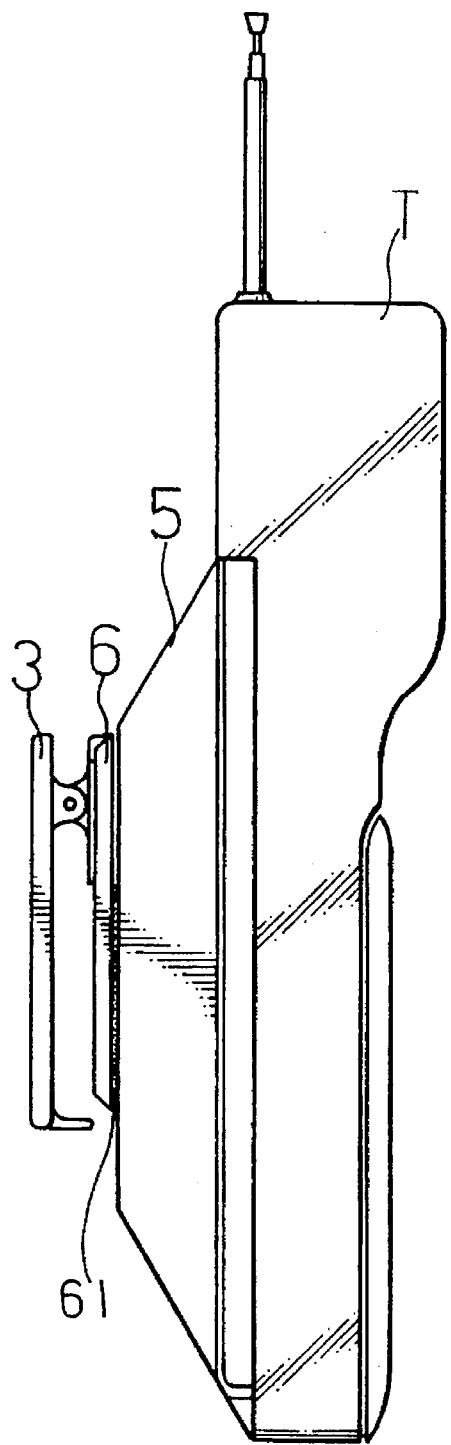
FIG. 8 is a side view of the clip assembly shown in the second embodiment.

As shown in FIGS. 7, 8, to the back side 51 of a battery unit 5 of a cell phone T, a pager, or a remote controller is attached a securing board 6 having a double-faced glue piece 61 fixed on the back side thereof for fixing the securing board 6 to a cell phone T, a pager or a remote-controller. The front side of the securing board 6 is provided with a retaining seat 62 having a positioning hole 63 defined at the upper portion thereof and engageable with the projected rib 323 of the press button 322. The securing board 6 is so compact that it will not increase the size of a cell phone or a B. B. call.

Figure 9:
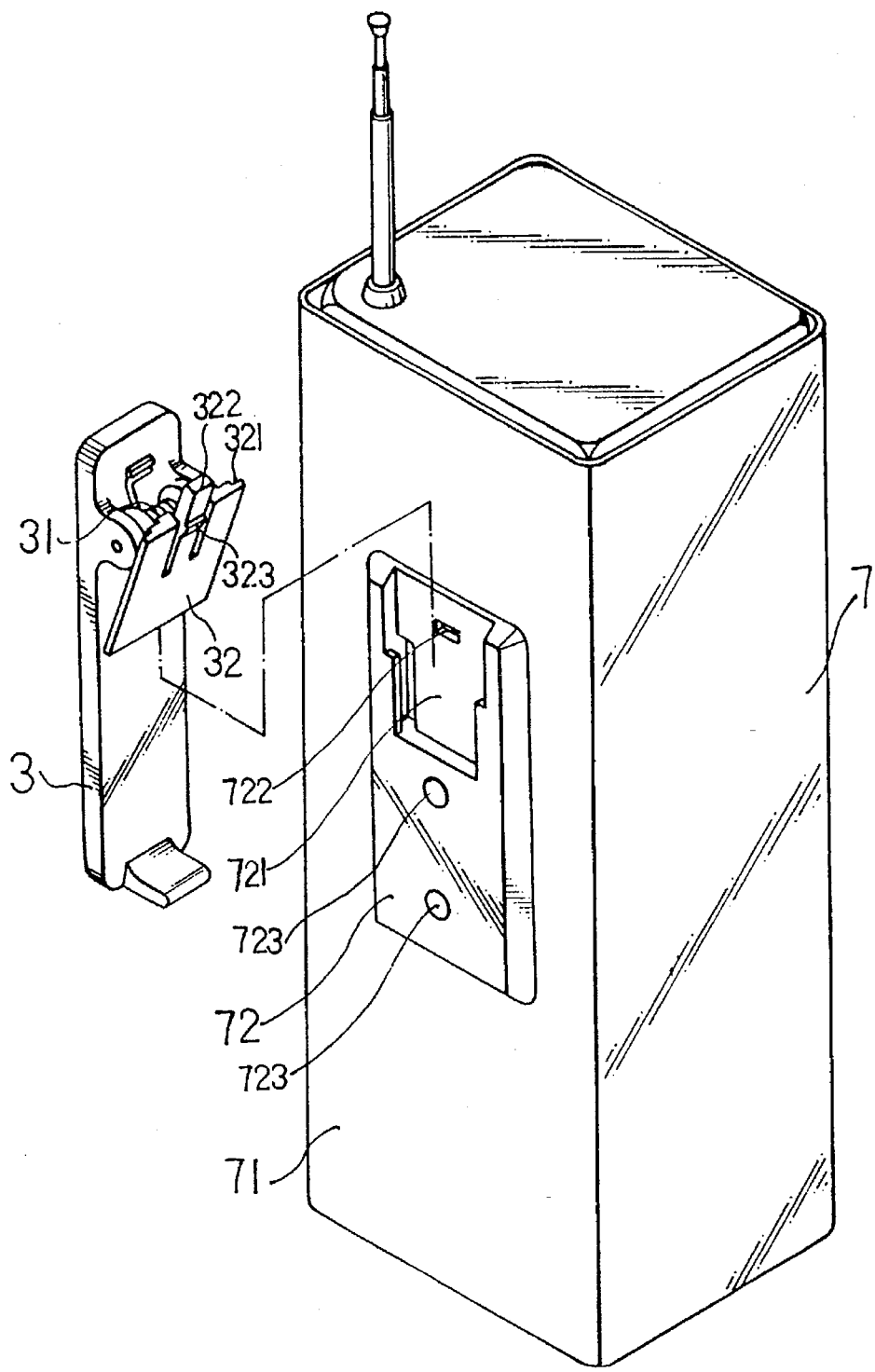
FIG. 9 is a diagram showing the third embodiment of the present invention.

Referring to FIG. 9, a further embodiment of the present invention is presented. A securing board 72 having a retaining seat 721 is fixed to the rear side 71 of a leather pocket 7 of a cell phone by way of rivets 723. A positioning hole 722 is disposed at the upper portion of the retaining seat 721 and is engageable with the projected rib 323 of the press button 322 for locking the clip member 3 is place.

Figure 10:
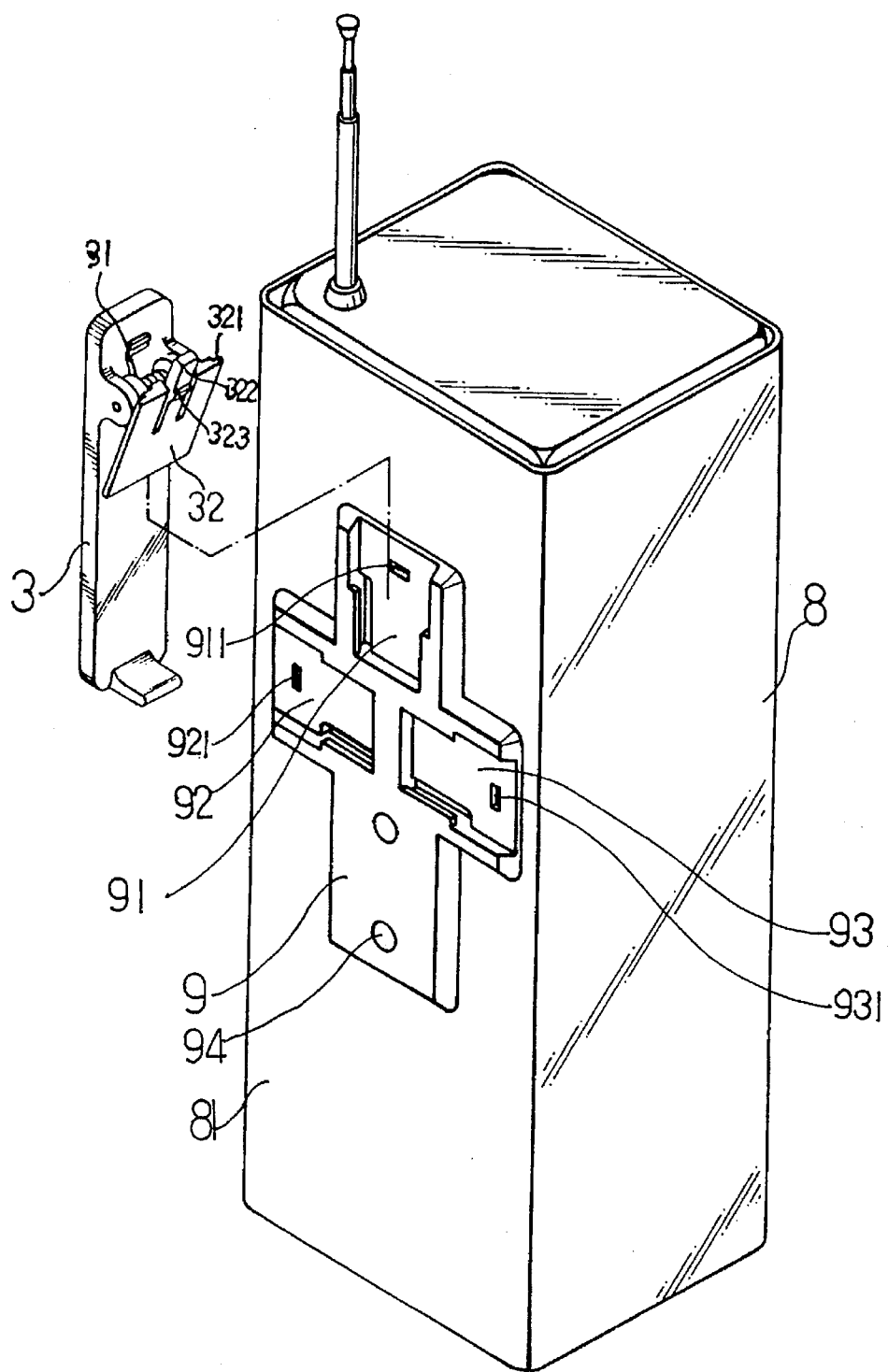
FIG. 10 is a diagram showing the fourth embodiment of the present invention.

Referring to FIG. 10, one further embodiment is illustrated. A securing board 9 having a number of retaining seats 91, 92, 93 disposed in different-orientations is made in a cross-shaped form and is fixed to a leather pocket 8 by way of rivets 94. The retaining seats 91, 92 and 93 are provided with a positioning hole 911, 921 and 931 respectively for the selective location of the projected rib 323 of the press button 322. The differently orientated retaining seats 91, 92 and 93 permit the clip member 3 to be selectively engaged therewith so that the cell phone can be placed in different orientations, i.e., in the horizontal or vertical direction. In such a manner that a person carrying a cell phone can stand up or squat easily without being interferred by the cell phone which abuts against the thigh of a person when the cell phone is vertically placed and the person is ready to squat.

I claim:

1. A detachable belt clip for supporting a device on a belt comprising:

a) a clip member having a push plate pivotally attached thereto, the push plate having opposite side edges and a press button movable with respect to the push plate, and a projecting rib projecting from the press button;

b) a securing board having a seat formed therein configured to slidably receive the push plate, and a positioning hole in the securing board configured to receive the projecting rib so as to retain the clip member attached to the securing board, wherein moving the press button relative to the push plate disengages the projecting rib from the positioning hole enabling the clip member to be detached from the securing board; and, c) attaching means extending between the securing board and the device to fixedly attach the securing board to the device.

2. The detachable belt clip of claim 1 wherein the attaching means comprises an adhesive element between the securing board and the device.

3. The detachable belt clip of claim 2 wherein the adhesive element comprises a double-sided adhesive material.

4. The detachable belt clip of claim 1 wherein the attaching means comprises rivets.

5. The detachable belt clip of claim 1 wherein the securing board has a plurality of seats formed therein disposed in different orientations.

* * * * *